US012338663B2

(12) United States Patent
Cumbo et al.

(10) Patent No.: US 12,338,663 B2
(45) Date of Patent: Jun. 24, 2025

(54) CLOSURE LATCH ASSEMBLY WITH BI-DIRECTIONAL POWER RELEASE MECHANISM

(71) Applicant: MAGNA CLOSURES INC., Newmarket (CA)

(72) Inventors: Francesco Cumbo, Pisa (IT); Luca Bigazzi, Ponsacco (IT)

(73) Assignee: MAGNA CLOSURES INC., Newmarket (CA)

( * ) Notice: Subject to any disclaimer, the term of this patent is extended or adjusted under 35 U.S.C. 154(b) by 356 days.

(21) Appl. No.: 17/956,945

(22) Filed: Sep. 30, 2022

(65) Prior Publication Data

US 2023/0104484 A1 Apr. 6, 2023

Related U.S. Application Data

(60) Provisional application No. 63/251,565, filed on Oct. 1, 2021.

(51) Int. Cl.

| | |
|---|---|
| ***E05B 81/14*** | (2014.01) |
| ***E05B 77/12*** | (2014.01) |
| ***E05B 81/06*** | (2014.01) |
| ***E05B 81/30*** | (2014.01) |
| ***E05B 81/34*** | (2014.01) |
| ***E05B 81/56*** | (2014.01) |
| ***E05B 81/72*** | (2014.01) |
| ***E05B 83/36*** | (2014.01) |

(52) U.S. Cl.

CPC .............. *E05B 81/14* (2013.01); *E05B 77/12* (2013.01); *E05B 81/06* (2013.01); *E05B 81/30* (2013.01); *E05B 81/34* (2013.01); *E05B 81/56* (2013.01); *E05B 81/72* (2013.01); *E05B 83/36* (2013.01)

(58) Field of Classification Search

CPC .......... E05B 81/06; E05B 81/14; E05B 81/30; E05B 81/34; E05B 81/42; E05B 81/56; E05B 81/72; E05B 77/02; E05B 77/10; E05B 77/12

See application file for complete search history.

(56) References Cited

U.S. PATENT DOCUMENTS

| | | | |
|---|---|---|---|
| 5,577,782 | A | 11/1996 | Johnson et al. |
| 7,032,937 | B2 | 4/2006 | Boecker et al. |
| 7,111,877 | B2 | 9/2006 | Larsen et al. |

(Continued)

*Primary Examiner* — Kristina R Fulton
*Assistant Examiner* — Noah Horowitz
(74) *Attorney, Agent, or Firm* — Dickinson Wright PLLC

(57) ABSTRACT

A power latch assembly for a vehicle door of a motor vehicle includes a ratchet configured for movement between striker capture and striker release positions, wherein the ratchet is biased toward the striker release position, and a pawl configured for movement between a ratchet holding position, whereat the pawl maintains the ratchet in the striker capture position, and a ratchet releasing position, whereat the pawl releases the ratchet to the striker release position. A powered actuator is energizable to move in a first direction to move the pawl under a first release torque from the ratchet holding position to the ratchet releasing position and the powered actuator is energizable to move in a second direction to move the pawl under a second release torque from the ratchet holding position to the ratchet releasing position, wherein the second release torque is greater than the first release torque.

20 Claims, 12 Drawing Sheets

(56) References Cited

U.S. PATENT DOCUMENTS

| | | | | |
|---|---|---|---|---|
| 7,261,335 | B2 | 8/2007 | Schupp | |
| 9,441,402 | B2 | 9/2016 | Larsen et al. | |
| 10,352,070 | B2 | 7/2019 | Margheritti et al. | |
| 11,035,157 | B2 | 6/2021 | Cumbo | |
| 11,377,882 | B2 * | 7/2022 | Schiffer | E05B 77/02 |
| 11,668,121 | B2 * | 6/2023 | Nam | E05B 81/06 292/201 |
| 2008/0224482 | A1 | 9/2008 | Cumbo et al. | |
| 2011/0074166 | A1 | 3/2011 | Taurasi et al. | |
| 2019/0292817 | A1 * | 9/2019 | Tomaszewski | E05B 79/20 |
| 2021/0372169 | A1 * | 12/2021 | Patane | E05B 81/34 |
| 2023/0034544 | A1 * | 2/2023 | Mozola | E05B 81/20 |
| 2024/0018804 | A1 * | 1/2024 | Hunt | E05B 81/42 |

* cited by examiner

CLOSURE LATCH ASSEMBLY WITH BI-DIRECTIONAL POWER RELEASE MECHANISM

CROSS-REFERENCE TO RELATED APPLICATION

This application claims the benefit of U.S. Provisional Application Ser. No. 63/251,565, filed Oct. 1, 2021, which is incorporated herein by reference in their entirety.

FIELD

The present disclosure relates generally to automotive door latches, and more particularly, to a power door latch assembly equipped with a bi-directional power release mechanism to provide a normal output force in a first direction of movement of a power release member and an increased output force in an opposite second direction of movement of the power release member.

BACKGROUND

This section provides background information related to automotive door latches and is not necessarily prior art to the concepts associated with the present disclosure.

A vehicle closure panel, such as a side door for a vehicle passenger compartment, is hinged to swing between open and closed positions and includes a latch assembly mounted to the door. The latch assembly functions in a well-known manner to latch the door when it is closed and unlatch and release the door to permit subsequent movement of the door to its open position. As is also well known, the latch assembly is configured to include a latch mechanism for latching the door and a release mechanism for unlatching the door. The release mechanism can be power-operated to unlatch the door.

During powered actuation of latch mechanism, it is known to actuate a gear mechanism to move a pawl from a ratchet holding position to a ratchet releasing position, thereby allowing a ratchet to move from a striker capture position to a striker releasing position, whereat the door can be moved from a closed position to an open position. In order to ensure the pawl is able to be moved from the ratchet holding position to the ratchet releasing position, the motor must be provided having a sufficient output force to overcome any friction build-up between the pawl and the ratchet. In some cases, high seal loads are present between the door and the vehicle body, such as in an accident scenario, for example. As such, it is known to incorporate a motor having an output force well in excess of that needed during normal use so as to be able to ensure the door can be opened in an increased seal load condition, or in any other high release load condition, such as may exist if ice builds up on latch components, for example. The need to provide the motor having an increased output force well in excess of that needed during normal use, although generally suitable for its intended use, comes with an increased cost, increased motor size, and increased motor weight, and thus, increasing the overall size of the latch assembly, thereby affecting the design parameters of the door.

Thus, there remains a need to develop alternative arrangements for latch mechanisms for use in vehicular door latches which optimize the ability to move a pawl from a ratchet holding position to a ratchet releasing position under the power of a powered motor without having to provide the powered motor having a size in excess of that needed during normal use conditions.

SUMMARY

This section provides a general summary of the disclosure, and is not intended to be a comprehensive and exhaustive listing of all of its features or its full scope.

It is an object of the present disclosure to provide a power latch assembly for motor vehicle closure applications that overcomes at least those drawbacks discussed above associated with known power latch assemblies.

It is another object of the present disclosure to provide a power latch assembly for motor vehicle closure applications that has a motor that is optimized in size and output force.

It is another object of the present disclosure to provide a power latch assembly for motor vehicle closure applications that has a motor capable of moving a pawl from a ratchet holding position to a ratchet releasing position under a high seal load condition, including a seal load condition produced during an accident condition, with the motor being minimized in size and output force.

It is another object of the present disclosure to provide a power latch assembly for motor vehicle closure applications that has a motor capable of moving a pawl from a ratchet holding position to a ratchet releasing position under a high seal load condition, including a seal load condition produced during an accident condition, with the motor being no larger in size and output force than needed for a normal operating condition of the power latch assembly.

In accordance with the above objects, one aspect of the disclosure provides a power latch assembly for a vehicle door of a motor vehicle including a ratchet configured for movement between striker capture and striker release positions and being biased toward the striker release position. The power latch assembly includes a pawl configured for movement between a ratchet holding position whereat the pawl maintains the ratchet in the striker capture position and a ratchet releasing position whereat the pawl releases the ratchet to the striker release position. A powered actuator is energizable to move the pawl from the ratchet holding position to the ratchet releasing position, wherein a bi-directional drive mechanism operably connects an output of the powered actuator to the pawl to produce a first toque on the pawl and a second on the pawl, with the second torque being greater than the first torque.

In accordance with another aspect of the disclosure, a power latch assembly for a closure panel includes: a ratchet configured for movement between a striker capture position and a striker release position and being biased toward said striker release position; a pawl configured for movement between a ratchet holding position, whereat the pawl maintains the ratchet in the striker capture position, and a ratchet releasing position, whereat the pawl releases the ratchet for movement of the ratchet to the striker release position; a power release actuator configured to move in a first direction and in a second direction to move the pawl from the ratchet holding position to the ratchet releasing position; and a drive mechanism operably connecting an output of the power release actuator to the pawl, the drive mechanism being configured to apply a first torque output on the pawl when the power release actuator rotates in the first direction and a second torque output on the pawl when the power release actuator rotates in the second direction, wherein the second torque is greater than the first torque.

In accordance with another aspect of the disclosure, the drive mechanism includes a power release gear operably driven by the output, a pawl release lever driven by the power release gear, and a pawl release link coupling the power release gear to the pawl release lever.

In accordance with another aspect of the disclosure, a drive lug can be fixed to the power release gear for conjoint rotation with the power release gear, wherein the drive lug is configured to engage the pawl release lever to move the pawl from the ratchet holding position to the ratchet releasing position when the power release actuator moves in the first direction.

In accordance with another aspect of the disclosure, the drive lug moves away from the pawl release lever when the power release actuator moves in the second direction, thereby adding minimal to no additional resistance on the power release actuator.

In accordance with another aspect of the disclosure, the pawl release link can be configured to engage the pawl release lever to move the pawl from the ratchet holding position to the ratchet releasing position when the power release actuator moves in the second direction.

In accordance with another aspect of the disclosure, the pawl release link and the pawl release lever are configured for lost motion with one another when the power release actuator moves in the first direction, thereby adding minimal to no additional resistance on the power release actuator.

In accordance with another aspect of the disclosure, the pawl release link can be provided having an elongate slot extending between opposite first and second ends and the pawl release lever can be provided with a pin disposed in the elongate slot, the pin being configured to slide within the elongate slot away from the first end toward the second end in the lost motion when the power release actuator moves in the first direction.

In accordance with another aspect of the disclosure, the first end of the elongate slot engages the pin to move the pawl release lever into engagement with the pawl to move the pawl from the ratchet holding position to the ratchet releasing position when the power release actuator moves in the second direction.

In accordance with another aspect of the disclosure, the pawl release link is pivotably fixed to the power release gear by a drive pin extending from the power release gear, the drive pin being spaced from a rotational axis (A) of the power release gear.

In accordance with another aspect of the disclosure, the power release actuator causes the pawl to move from the ratchet holding position to the ratchet releasing position in X seconds upon rotating said power release actuator in the first direction and causes the pawl to move from the ratchet holding position to the ratchet releasing position in X+Y seconds upon rotating the power release actuator in the second direction, wherein X seconds is less that X+Y seconds.

In accordance with another aspect of the disclosure, a method of releasing a power latch assembly of a closure panel of a motor vehicle is provided. The method includes: detecting a command to power release the power latch assembly; operating a motor of the power latch assembly in a first mode; detecting whether the power latch assembly has been released; stopping the motor if the detecting indicates the power latch assembly has been released; operating the motor of the power latch assembly in a second mode if the detecting indicates the power latch assembly has not been released; detecting whether the power latch assembly has been released; and stopping the motor if the detecting indicates the power latch assembly has been released.

In accordance with another aspect of the disclosure, the first mode of the method can include rotating an output of the motor in a first direction and the second mode can include rotating the output of the motor in a second direction opposite the first direction.

In accordance with another aspect of the disclosure, the method can further include causing a first torque to be imparted on a pawl of the power latch assembly upon rotating the output of the motor in the first direction and causing a second torque to be imparted on the pawl of the power latch assembly upon rotating the output of the motor in the second direction, with the second torque being greater than the first torque.

In accordance with another aspect of the disclosure, the method can further include causing the pawl to move from a ratchet holding position to a ratchet releasing position in X seconds upon rotating the output of the motor in the first direction and causing the pawl to move from the ratchet holding position to the ratchet releasing position in a minimum of X+Y seconds upon rotating the output of the motor in the second direction, wherein X seconds is less that X+Y seconds.

In accordance with another aspect of the disclosure, the method can further include causing a pawl release lever to engage the pawl to impart the first torque on the pawl upon rotating the output of the motor in the first direction and causing the pawl release lever to engage the pawl to impart the second torque on the pawl upon rotating the output of the motor in the second direction.

In accordance with another aspect of the disclosure, the method can further include engaging the pawl release lever with a drive lug extending from a power release gear driven by the motor to impart the first torque on the pawl upon rotating the output of the motor in the first direction and engaging the pawl release lever with a pawl release link coupling the power release gear to the pawl release lever to impart the second torque on the pawl upon rotating the output of the motor in the second direction.

In accordance with another aspect of the disclosure, a method of releasing a power latch assembly of a closure panel of a motor vehicle includes: operating a power release actuator of the power latch assembly in a first mode to rotate an output in a first direction to move a pawl via application of a first torque from a ratchet holding position to a ratchet releasing position and causing a ratchet to move from a striker capture position to a striker release position; and, if the pawl fails to move to the ratchet release position under the first mode, operating the power release actuator of the power latch assembly in a second mode to rotate the output in a second direction opposite the first direction to move the pawl via application of a second torque from the ratchet holding position to the ratchet releasing position and causing the ratchet to move from a striker capture position to a striker release position, wherein the second torque is greater than the first torque.

In accordance with another aspect of the disclosure, the method can further include detecting whether the power latch assembly has been released while moving the power release actuator in the first direction and stopping the power release actuator if the detecting indicates the power latch assembly has been released.

In accordance with another aspect of the disclosure, the method can further include moving the power release actuator in the second direction if the detecting indicates the power latch assembly has not been released while moving in the first direction and stopping the power release actuator if the detecting indicates the power latch assembly has been released while moving in the second direction.

According to another aspect of the present disclosure, a method of increasing the output torque of a latch power release actuator of a power latch assembly from a first output torque to an increased second output torque is provided. The method includes configuring the power release actuator to rotate an output in a first direction to drive a power release gear in a first direction to generate the first output torque, and configuring the power release actuator to rotate the output in a second direction to drive the power release gear in a second direction opposite the first direction to generate the second output torque.

According to another aspect of the present disclosure, the method can further include configuring an electronic control unit (ECU) in operable communication with the power release actuator and configuring the ECU to signal the power release actuator to change the direction of rotation of the output of the power release actuator from the first direction to the second direction when increased torque is needed to move the pawl from the ratchet holding position to the ratchet releasing direction.

According to another aspect of the present disclosure, the method can further include configuring the power release actuator to change the direction of rotation of the output of the power release actuator from the first direction to the second direction automatically when the torque applied to the pawl while the output of the power release actuator is moving in the first direction is insufficient to move the pawl from the ratchet holding position to the ratchet releasing direction.

In accordance with another aspect, there is provided a power latch assembly for a closure panel including a ratchet configured for movement between a striker capture position and a striker release position and being biased toward said striker release position, a pawl configured for movement between a ratchet holding position, whereat said pawl maintains said ratchet in said striker capture position, and a ratchet releasing position, whereat said pawl releases said ratchet for movement of said ratchet to said striker release position, a power release actuator having an output, the power release actuator configured to operate in a normal mode, whereby the output of the power release actuator is caused to rotate in a first direction, and in a crash mode, whereat the output is caused to rotate in a second direction opposite the first direction, and a drive mechanism operably connecting the output of said power release actuator to said pawl, the drive mechanism including a cam mechanism and a crank mechanism, wherein the power release actuator is operable to move the pawl from the ratchet holding position to the ratchet releasing position using the cam mechanism when the power release actuator is in the normal mode and using the crank mechanism when the power release actuator is in the crash mode.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and other aspects, features, and advantages of the present disclosure will be readily appreciated, as the same becomes better understood by reference to the following detailed description when considered in connection with the accompanying drawings wherein.

Corresponding reference numerals are used throughout all of the drawings to indicate corresponding parts.

DETAILED DESCRIPTION OF EXAMPLE EMBODIMENTS

Figure 1:
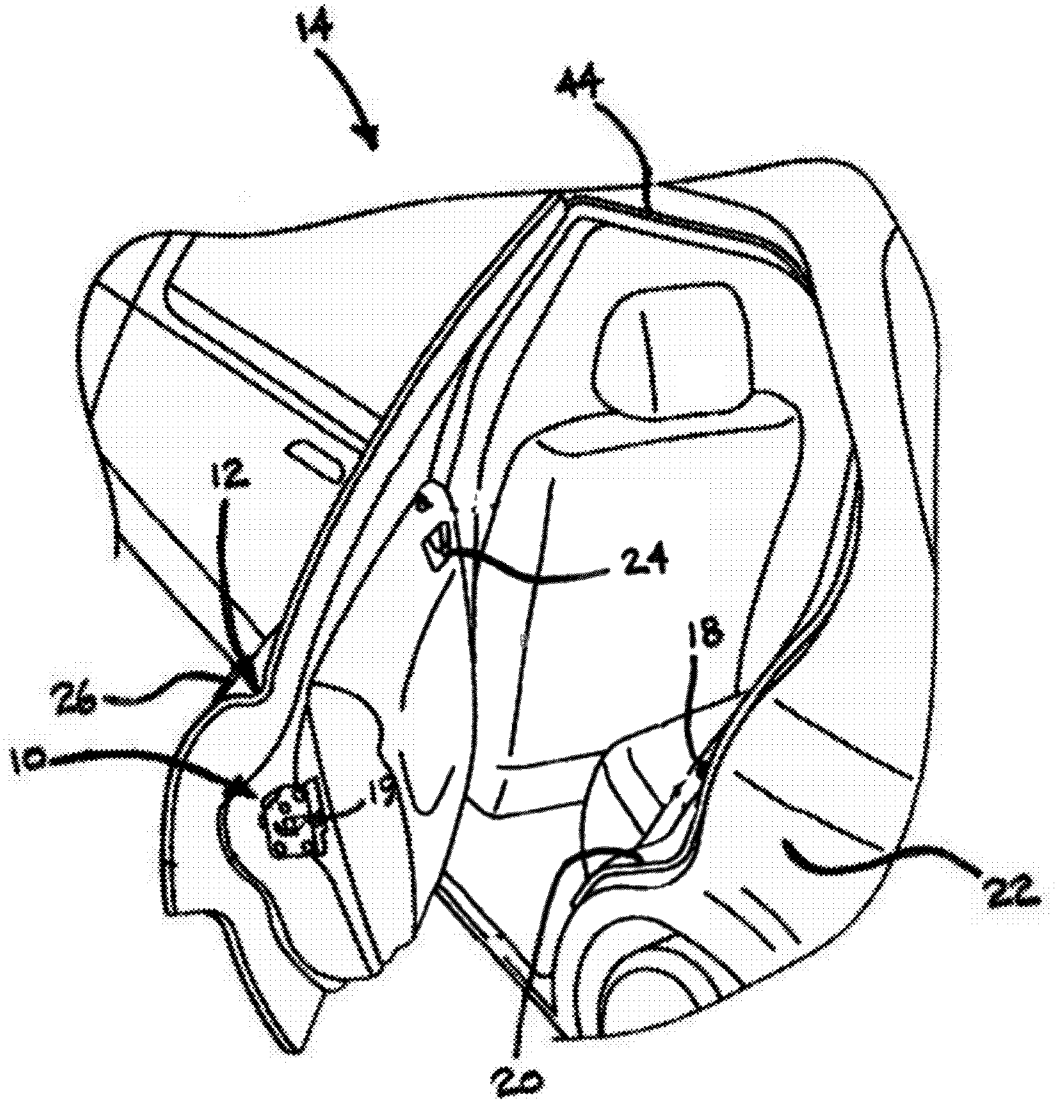
FIG. 1 is a partial perspective view of a motor vehicle having a side door equipped with a power latch assembly embodying the teachings of the present disclosure.

One or more example embodiments of a powered latch assembly of the type well-suited for use in motor vehicle closure systems will now be described with reference to the accompany drawings. However, these example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail, as they will be readily understood by a skilled artisan.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 2:
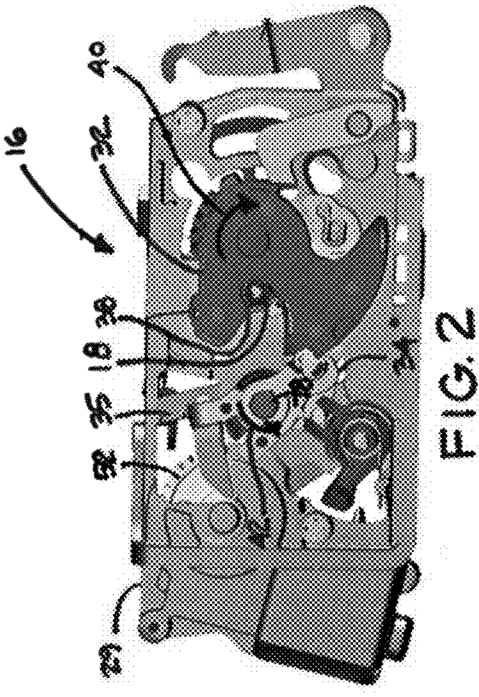
FIG. 2 is a front side view of a power latch assembly embodying the teachings of the present disclosure.
Figure 2A:
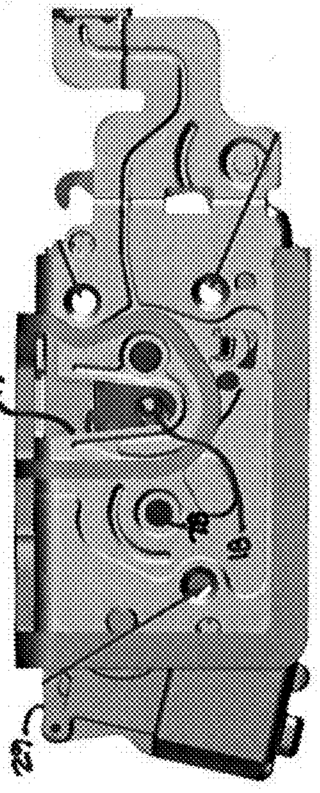
FIG. 2A is a view similar to FIG. 2 with a cover plate assembled to the power latch assembly.
Figure 4B:
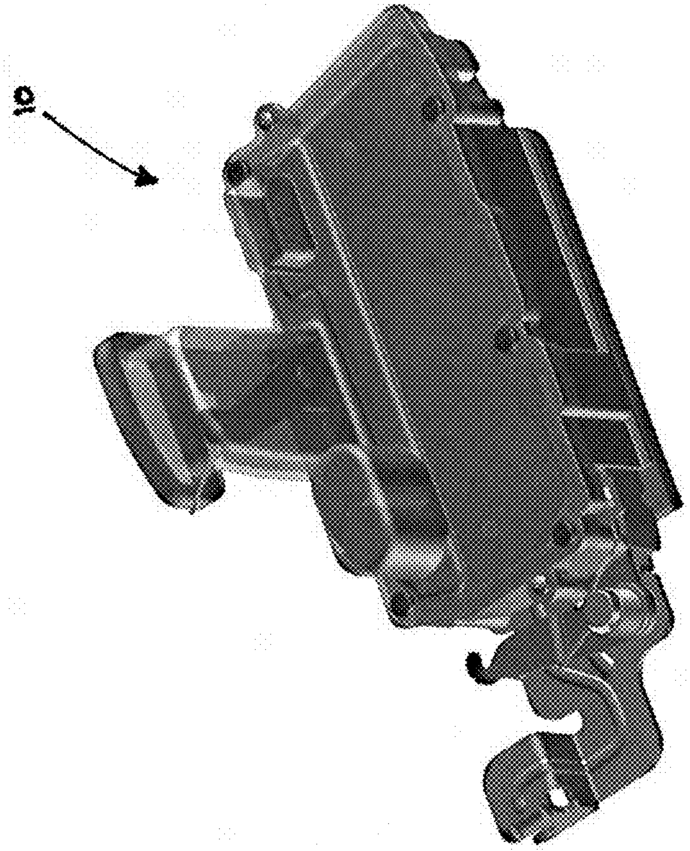
FIG. 4B is a perspective view of the power latch assembly looking generally along the direction of arrow 4B of FIG. 4A.
Figure 4A:
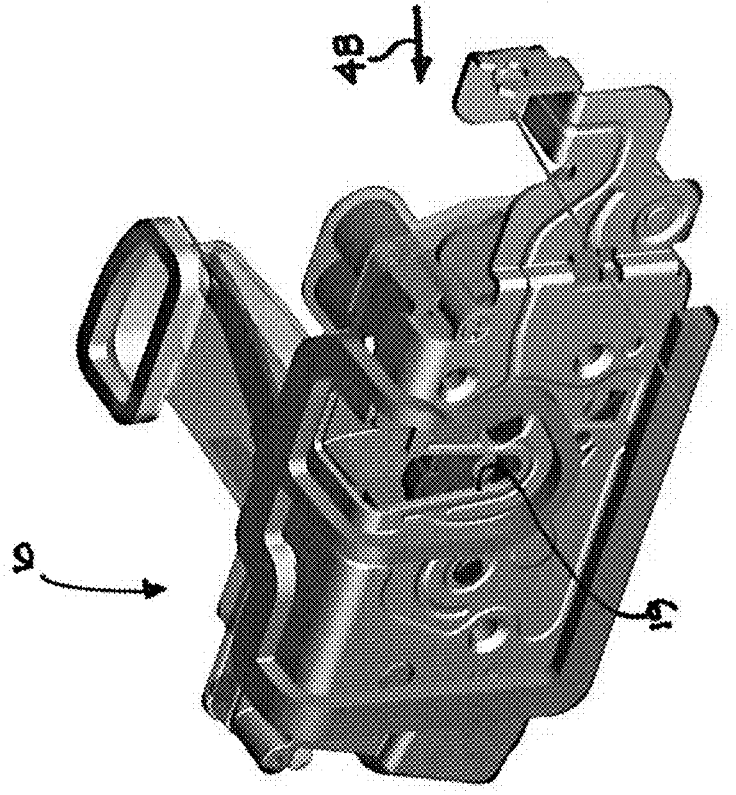
FIG. 4A is a side perspective view of the power latch assembly illustrating an emergency release lever and a cinch lever thereof.

Referring initially to FIG. 1, a non-limiting example of a power latch assembly is shown, referred to hereafter simply as latch assembly 10, installed in a closure panel, such as, by way of example and without limitation, a door, shown as a passenger side swing door 12 of a motor vehicle 14. Latch assembly 10 includes a latch mechanism 16 (FIG. 2) configured to releasably latch and hold a striker 18 mounted to a sill portion 20 of a vehicle body 22 when swing door 12 is closed. Latch assembly 10 can be selectively actuated via an inside door handle 24, an outside door handle 26, and a key fob 28 (FIG. 2). As will be detailed, latch assembly 10 is configured to be power-operated via selective actuation of a power release actuator, such as an electric motor 30. For reasons discussed hereafter, power release actuator 30 is able to be minimized in size, weight and power output, thereby enhancing the flexibility of design of the closure panel, while also reducing the cost associated therewith. Further yet, as discussed in further detail below, the power release actuator 30 is assured of having sufficient power to move latch mechanism 16 from a latched state to an unlatched state, even if friction forces within latch mechanism are suddenly increased, such as may result in a crash condition, thereby allowing closure panel 12 to be moved from a closed position to an open position.

Referring to FIG. 2, shown is a non-limiting embodiment of latch assembly 10 and latch mechanism 16 contained in a housing, shown in part via a latch frame plate 29, with some components removed for clarity purposes. Latch mechanism 16 includes a ratchet 32 and a pawl 34, a release mechanism including, in a non-limiting embodiment, a pawl release lever 35 and release link, also referred to as pawl release link 36 (FIGS. 6A-11A). Illustratively, pawl release link 36 is configured as a crank mechanism. Ratchet 32 is movable between a striker capture position, whereat ratchet 32 retains striker 18 with a striker slot 38 of ratchet 32 and swing door 12 in closed position, and a striker release position, whereat ratchet 32 permits release of striker 18 from a fishmouth 19 provided by latch housing of latch assembly 10 to allow movement of swing door 12 to the open position. A ratchet biasing member 40 (shown schematically in FIG. 2), such as a spring, is provided to normally bias ratchet 32 toward its striker release position. Pawl 34 is movable between a ratchet holding position, whereat pawl 34 holds ratchet 32 in its striker capture position, and a ratchet releasing position whereat pawl 34 permits ratchet 32 to move to its striker release position. A pawl biasing member 42 (shown schematically in FIG. 2), such as a suitable spring, is provided to normally bias pawl 34 toward its ratchet holding position. A roller element 37 is illustratively shown as provided between the ratchet 32 and the pawl 34 for reducing the friction between the ratchet 32 and the pawl 34 during release of the pawl 34. Illustrative examples of a roller element 37, such as a cylindrical roller or a spherical roller are shown in US Patent Application No. US20200370346A1 entitled "Automotive latch including bearing to facilitate release effort", the entire content of which is incorporated herein by reference.

Pawl release link 36 is operatively (directly or indirectly via another component, such as an intermediate or pawl release lever 35, and shown as indirectly via pawl release lever 35, by way of example and without limitation) coupled, also referred to as connected, to pawl 34 and is movable between a deployed position, also referred to as pawl release position, whereat pawl release link 36 moves pawl 34 against the bias of pawl biasing member 42 to its ratchet releasing position (FIGS. 11A and 11B), and a non-deployed position, also referred to as home position (FIGS. 6A and 10A), whereat pawl release link 36 permits pawl 34 to remain in its ratchet holding position.

Pawl release link 36 can be moved to its deployed pawl release position via selective actuation of power release actuator 30. Power release actuator 30 has an output, shown as being provided by an output member, also referred to as output shaft 48 (FIGS. 5, 6A and 9A), which is operably connected or coupled to pawl 34 via a drive mechanism 50 (identified in FIG. 5). Drive mechanism 50, when driven by power release actuator 30 in a high load and/or emergency situation, is configured to move pawl release link 36 to its deployed pawl release position, whereat pawl 34 is moved to its ratchet releasing position; however, under normal use/normal release (i.e. normal and expected release load), pawl release link 36 is not relied on for release of pawl 34 to its ratchet release position, as discussed further below.

Figure 3:
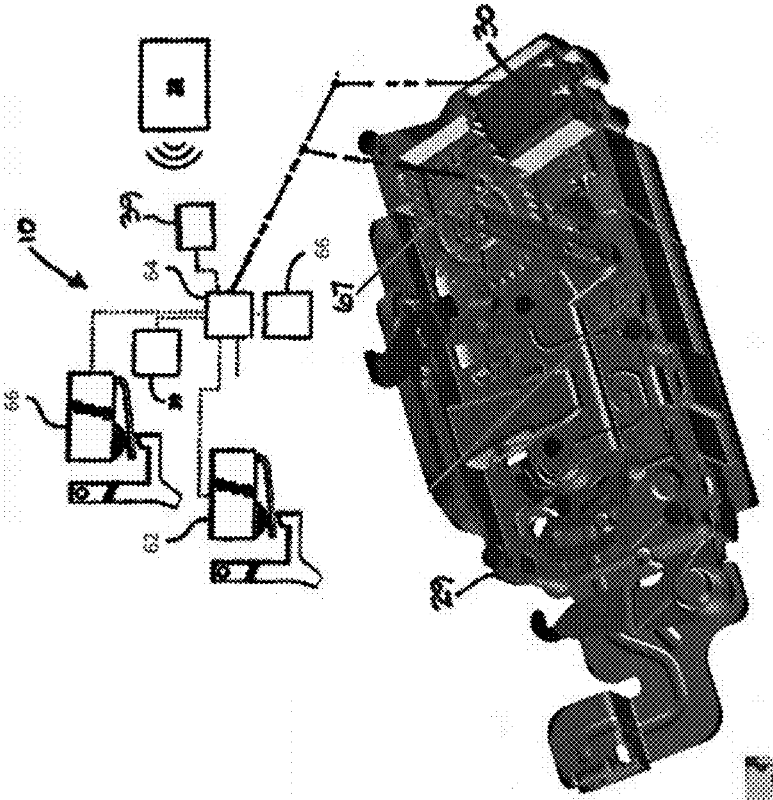
FIG. 3 is a rear side perspective view of the power latch assembly of FIGS. 2 and 2A shown schematically in operable communication with various components of the side door, with some components removed for clarity purposes only.

When desired to move pawl 34 from the ratchet holding position to the ratchet releasing position during normal use conditions, such as when a person approaches motor vehicle 14 with electronic key fob 28 (FIG. 2) and actuates the outside door handle 26, for example, sensing both the presence of key fob 28 and that outside door handle 26 has been actuated (e.g. via electronic communication between an electronic switch 62 (FIG. 3, wherein inside door handle 24 also is actuatable via an electronic switch 63) and a latch electronic control unit (ECU) shown at 64 that at least partially controls the operation of latch assembly 10). In turn, latch ECU 64 actuates power release motor 30 to cause output shaft 48 of the power actuator 30 to rotate in a first direction to release the latch mechanism 16 and shift latch assembly 10 into an unlatched operating state so as to facilitate subsequent opening of vehicle swing door 12. Power release motor 30 can be alternatively activated as part of a proximity sensor based entry feature (radar based proximity detection for example), for example when a person approaches vehicle 14 with electronic key fob 28 (FIG. 3) and actuates a proximity sensor 66, such as a capacitive sensor, or other touch/touchless based sensor (based on a recognition of the proximity of an object, such as the touch/swipe/hover/gesture or a hand or finger), (e.g. via communication between the proximity sensor 66 and latch ECU 64 that at least partially controls the operation of latch assembly 10). In turn, if detecting a normal use condition, such as the presence of electronic key fob 28, by way of example and without limitation, latch ECU 64 actuates power release motor 30 to rotate the output shaft 48 in the first direction to release the latch mechanism 16 and shift latch assembly 10 into an unlatched operating state so as to facilitate subsequent opening of vehicle door 12, as discussed above.

Figure 6B:
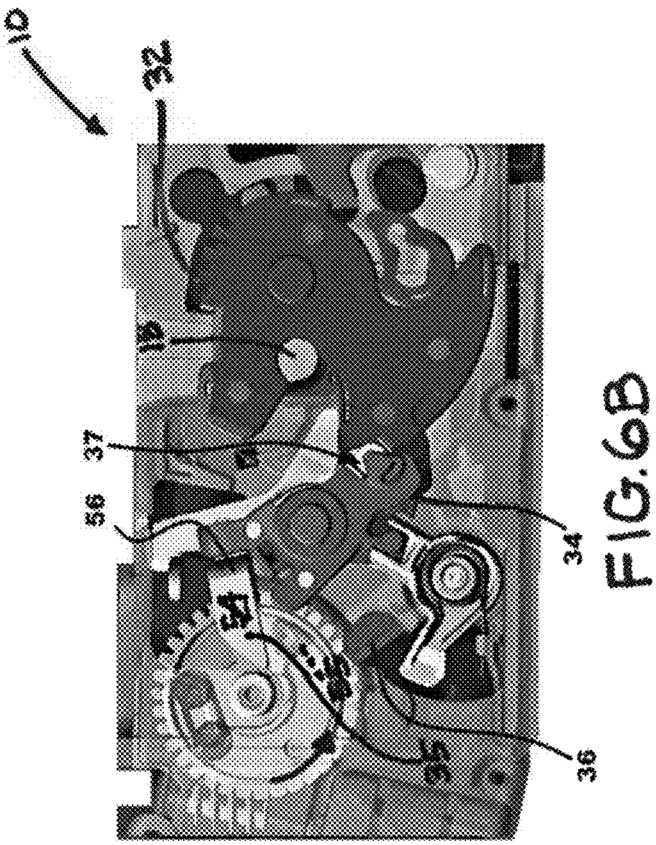
FIG. 6B is an opposite side view of FIG. 6A showing a pawl in a ratchet holding position and a ratchet in a striker capture position.
Figure 6A:
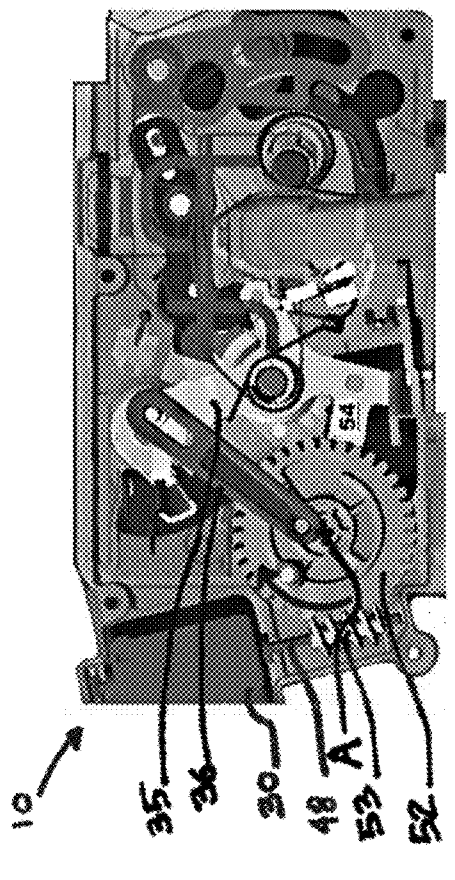
FIG. 6A is a side view of the power latch assembly of FIG. 2 shown during an initial stage of a normal release condition.
Figure 7B:
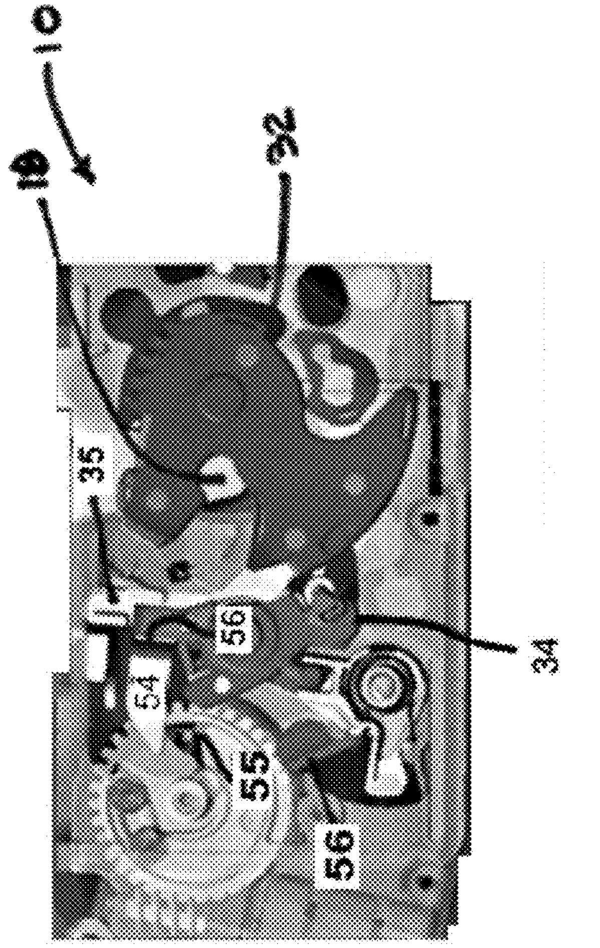
FIG. 7B is an opposite side view of FIG. 7A showing the pawl just as it is leaving the ratchet holding position.
Figure 7A:
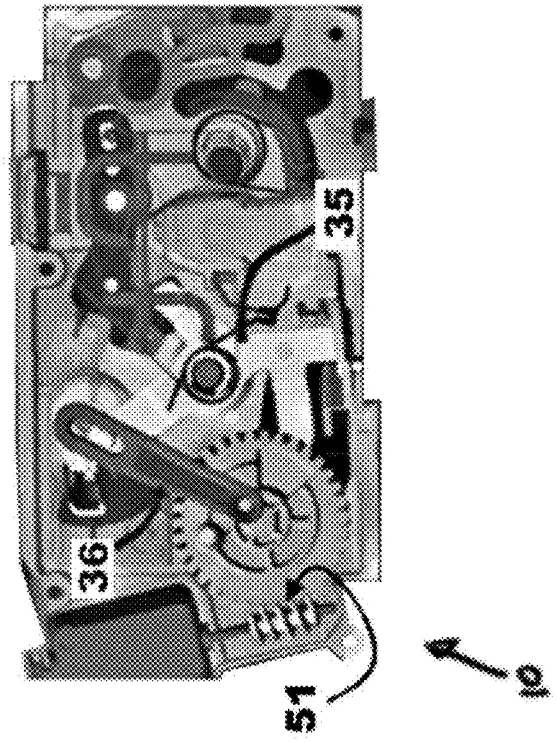
FIG. 7A is a view similar to FIG. 6A shown at an intermediate stage of release during the normal release condition.
Figure 8B:
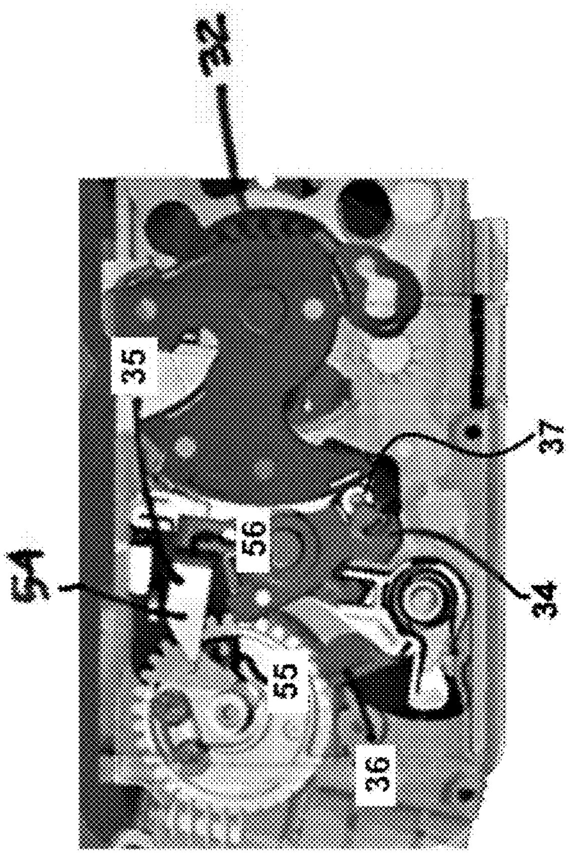
FIG. 8B is an opposite side view of FIG. 8A showing the pawl in a ratchet releasing position and the ratchet in a striker releasing position.
Figure 8A:
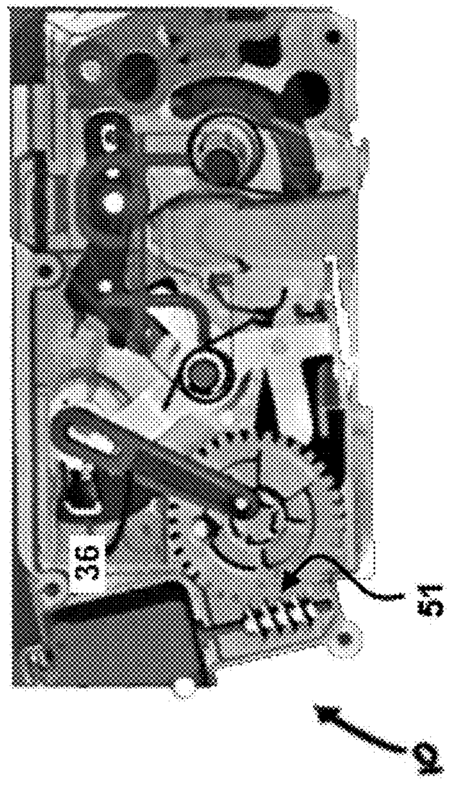
FIG. 8A is a view similar to FIG. 7A shown at a final stage during the normal release condition.
Figure 9B:
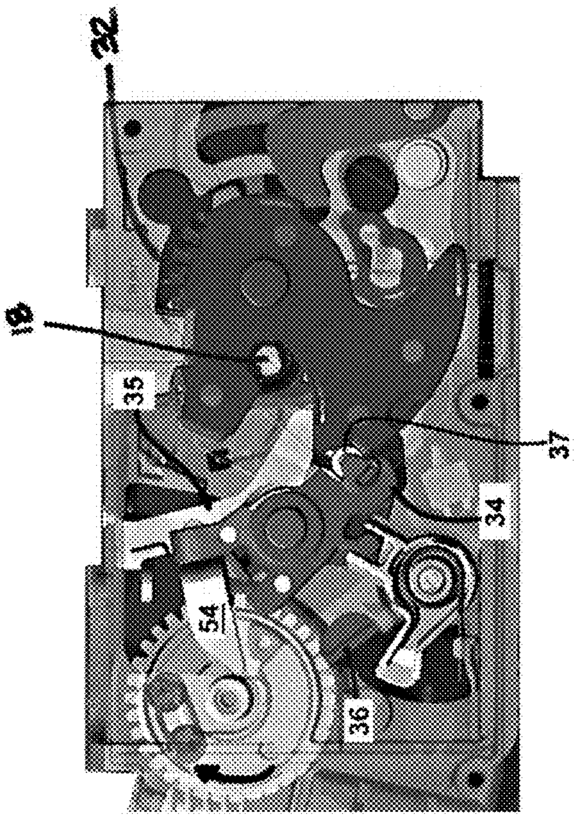
FIG. 9B is an opposite side view of FIG. 9A showing the pawl in the ratchet holding position and the ratchet in the striker capture position.
Figure 9A:
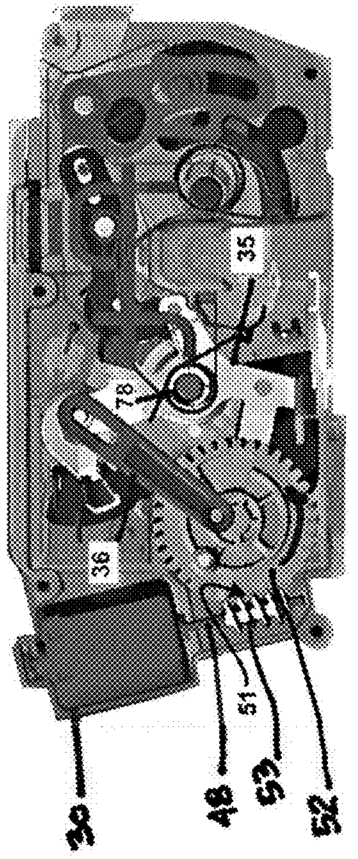
FIG. 9A is a side view of the power latch assembly of FIG. 2 shown during an initial stage of a high load release condition.
Figure 10B:
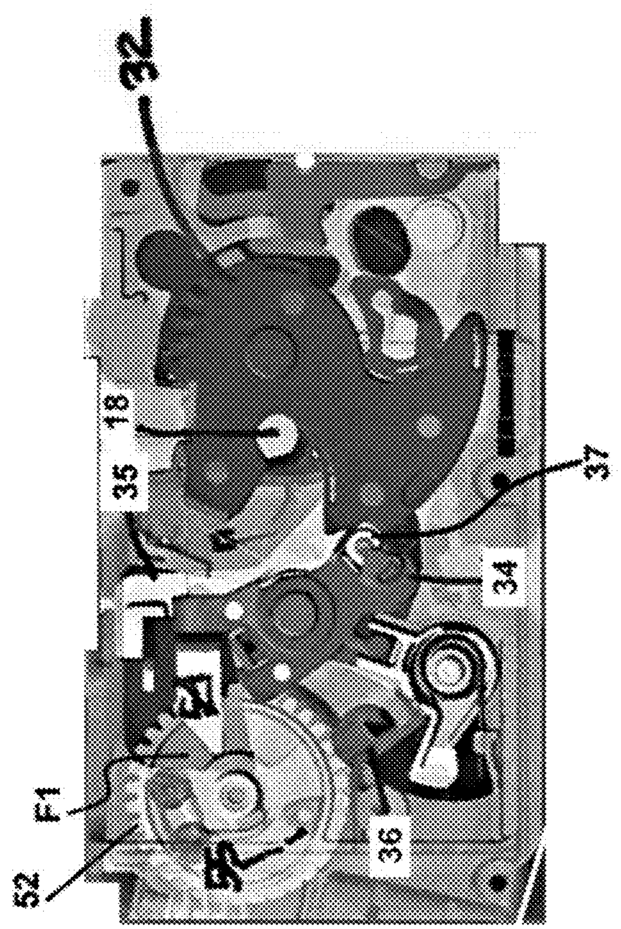
FIG. 10B is an opposite side view of FIG. 10A showing the pawl just as it is leaving the ratchet holding position.
Figure 10A:
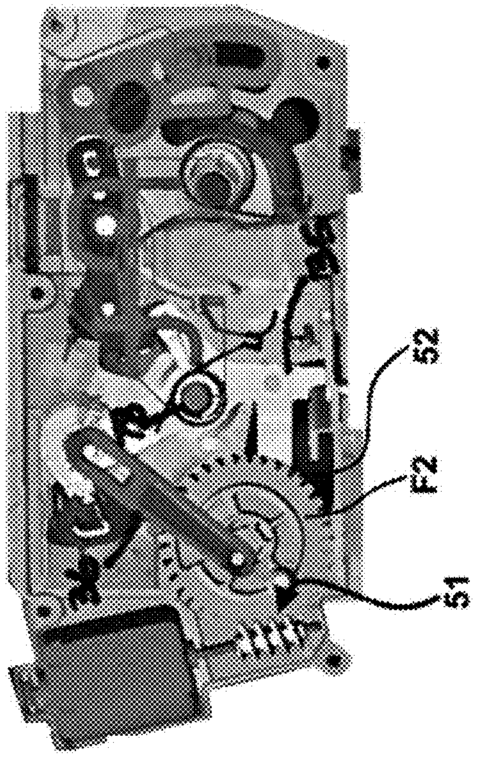
FIG. 10A is a view similar to FIG. 9A shown at an intermediate stage of release during the high load release condition.

During normal operation, as illustrated in FIGS. 6A-9B, as output shaft 48 is rotated in the first direction, a drive member or drive gear 53, which is fixed for conjoint rotation with output shaft 48, causes a power release gear, also referred to as driven gear 52, to rotate about a rotational axis A (FIG. 6A) in a clockwise direction, as viewed in FIGS. 6A-9A, whereupon a drive lug 55 fixed to driven gear 52, for example the drive lug 55 may be a cam mechanism, shown as being fixed adjacent an outer periphery of driven gear 52, is rotated into engagement with pawl release lever 35, shown as engaging a driven arm 54 of pawl release lever, which in turn causes pawl release lever 35 to rotate counterclockwise, as viewed in FIG. 6A, whereupon a drive shoulder 56 of driven arm 54 forcibly engages pawl 34 to rotate pawl 34 in a clockwise direction, as viewed in FIG. 6B, from its ratchet holding position to its ratchet releasing position (FIG. 8B). Drive lug 55 is an example of a first output of the power release gear 52 provided on one face (F1) of the power release gear 52 (see FIG. 10B for example). It is recognized that first output and second output of power release gear 52 may be optionally provided on the same face of power release gear 52. Illustratively first output and second output when provided on opposite faces may couple with links or arms moveable on separate planes to avoid interference with each other. Drive gear 53, shown for example as a worm gear, and driven gear 52, shown for example as a spur gear, are connected by a meshed interface 51 of gear teeth. In accordance with an illustrative example, only a single interface of meshed teeth between gears may be provided, and therefore only a single stage of gear reduction is provided such that additional gears meshed with driven gear 52 are not required. Multiple gear reduction stages may be optionally provided for example depending on the desired release force to act on pawl 34 due to the exclusion of roller element 37 or other factors such as seal loading or the exclusion of the roller element 37, however with drawbacks of adding size and additional components to the latch assembly. As power release gear 52 is being driven by drive gear 53 during the normal operation, power release gear 52 is free to move in a lost motion relation with pawl release link 36, and thus, pawl release link 36 does not impart any resistance of consequence on power release gear 52 or on motor 30.

Figure 5:
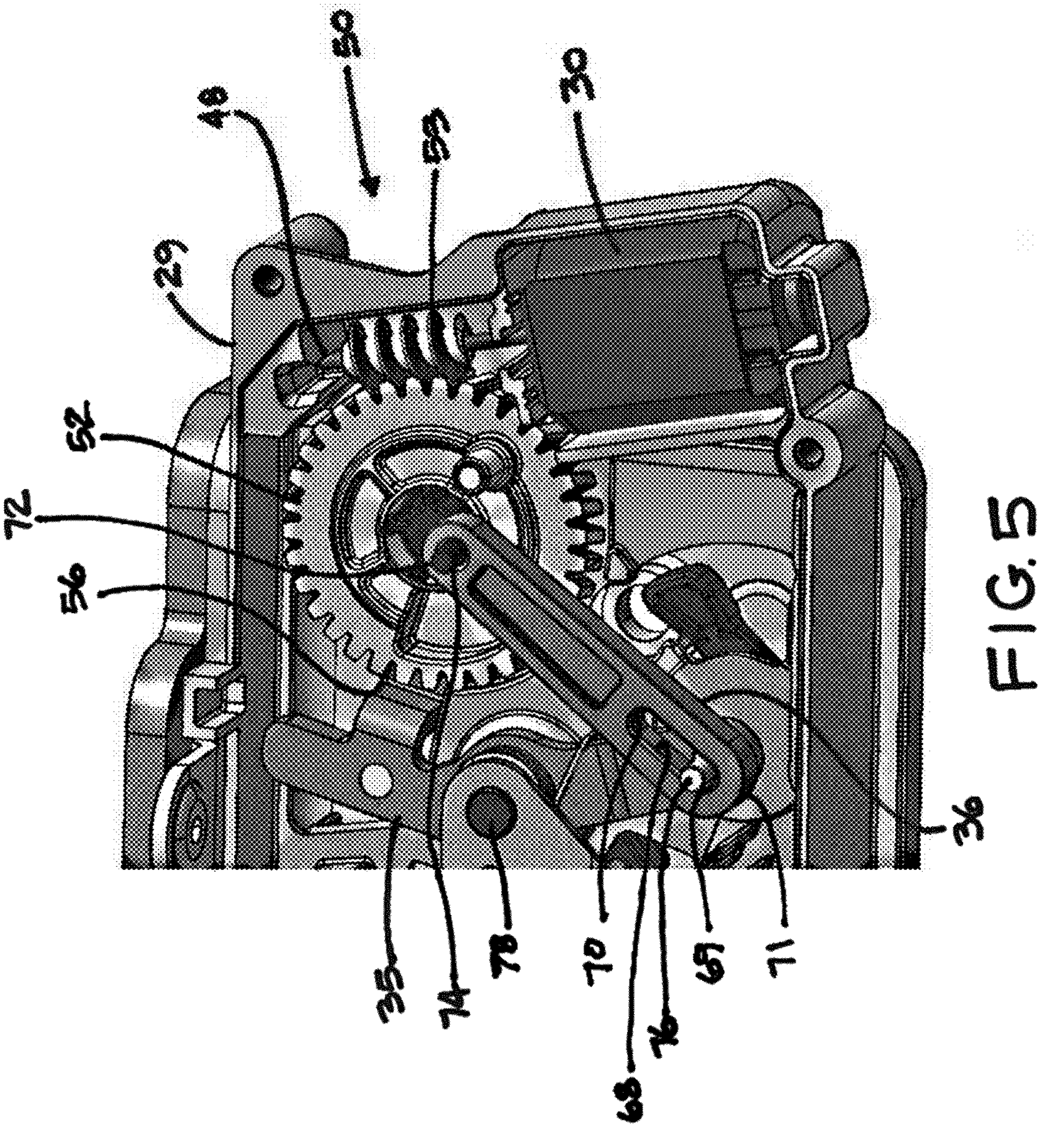
FIG. 5 is an enlarged fragmentary view illustrating a latch release mechanism including a link member operably coupling a release lever to a power release gear of the power latch assembly of FIG. 2.

To establish the lost motion relation between power release gear 52 and pawl release link 36, as best shown in FIG. 5, pawl release link has an elongate slot 68 extending lengthwise between opposite first (drive) and second (non-drive) ends 69, 70 intermediate an opposite first end 71 and second end 72 of pawl release link 36. Elongate slot 68 is illustratively shown as a linearly extending elongated slot, or a linear slot, and not a curved slot. Power release gear 52 is operably coupled to pawl release link 36 proximate second end 72 of pawl release link 36 via a drive pin 428, shown as being pivotably fixed thereto. Drive pin 428 is illustratively shown as extending from a second face F2 of the power release gear 52 as seen for example in FIG. 10A. Pawl release link 36 is operably couple to pawl release lever 35 proximate first end 71 of pawl release link 36 via a pin 76 extending from pawl release link 36 into slot 68. Pin 76 is configured for sliding movement along slot 68, wherein the length of slot 68 is greater than the diameter of pin 76, thereby creating the lost motion connection between pawl release link 36 and pawl release lever 35, meaning that pin 76 can translate within slot 68 until it comes into engagement with one of the ends 69, 70 of slot 68.

Then, upon release of power latch assembly 10, ECU 64, upon receiving a signal from a position sensor 67, which can be configured to detect the relative position of ratchet 32 and/or pawl 34, such as via detecting the orientation of power release gear 52, by way of example and without limitation, signals power release motor 30 to rotate in an opposite direction, thereby causing a reversal in motion of power release gear 52 in a counterclockwise direction, as viewed in FIG. 6A, whereupon pawl release link 36 is allowed to return to its home position, thereby returning pawl 34 to the ratchet holding position via pawl biasing member 42 to the ratchet holding position.

In an emergency use condition (defined by pawl 34 and ratchet 32 having an unusually high, increased amount of friction therebetween as compared to the normal use condition), pawl 34 is moved to its ratchet release position via a power release gear 52 being driven by drive gear 53 in a second direction opposite the first direction of a normal use operation, shown as being driven in a counterclockwise direction, as viewed in FIGS. 9A-11A.

Figure 11B:
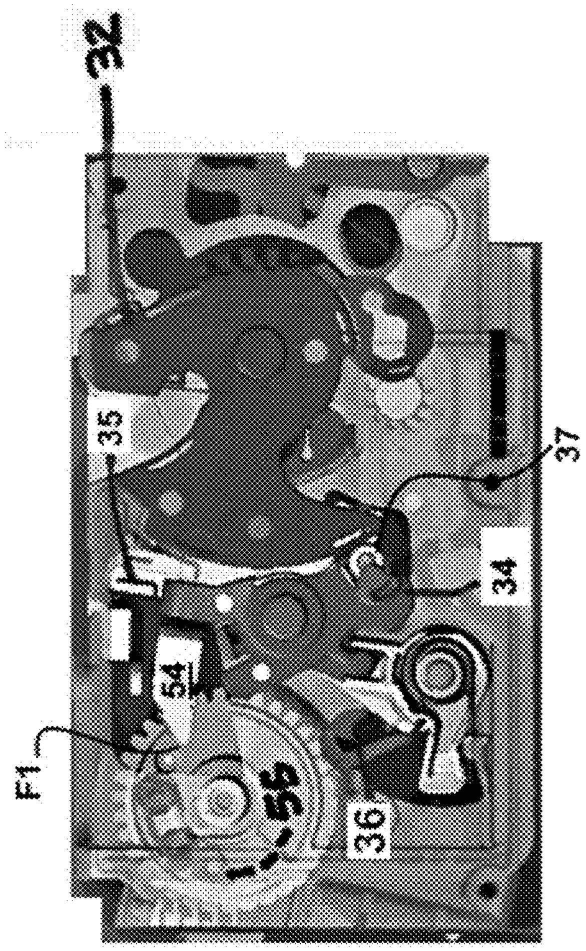
FIG. 11B is an opposite side view of FIG. 11A showing the pawl in the ratchet releasing position and the ratchet in the striker releasing position.
Figure 11A:
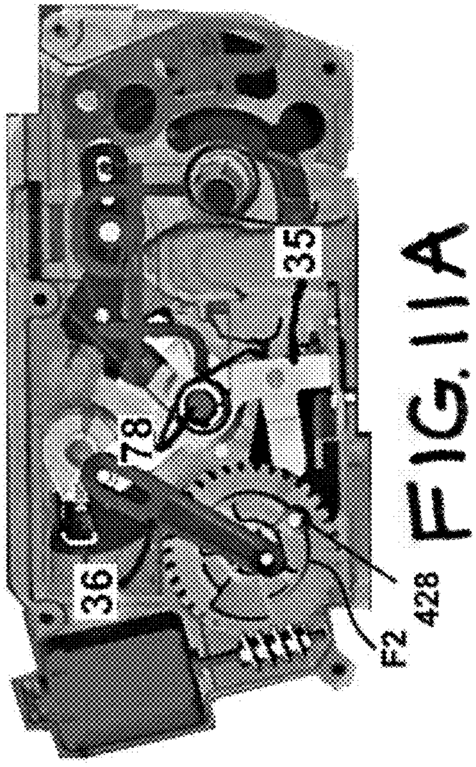
FIG. 11A is a view similar to FIG. 11A shown at a final stage during the high load release condition.

During emergency operation, including any time normal operation fails to cause pawl 34 to be moved from its ratchet holding position to its ratchet releasing position, as can be detected by position sensor 67, ECU signals power release motor 30 to rotate output shaft 48 in the second direction, opposite the first direction of normal operation. As such, drive lug 55 is caused to be driven away from driven arm 54 of pawl release lever 35 while pawl release link 36 is caused to rotate pawl release lever 35 in a clockwise direction about a pawl release lever post 78, as viewed in FIG. 10A, which can serve as a pawl pivot post about which pawl 34 is supported and pivots, by way of example and without limitation. As such, drive gear 53 causes power release gear 52 to rotate in a counterclockwise direction, as viewed in FIG. 10A, such that a drive pin 74 as an example of a second output of the power release gear 52, shown as extending in fixed relation outwardly from power release gear 52 in spaced relation from axis A, pulls pawl release link 36, whereupon first end 69 of slot 68 engages pin 76 fixed to pawl release lever 35, thereby driving pawl release lever 35 in a counterclockwise direction, as viewed in FIG. 10A, thus, causing drive shoulder 56 of pawl release lever 35 to drive pawl 34 from its ratchet holding position (FIG. 9B) to its ratchet releasing position (FIG. 11B). The spacing of drive pin 74 from axis A can be provided as desired to produce the desired torque, and is shown as being proximate axis A in relative close relation therewith, e.g. 1-5 mm, by way of example and without limitation, to establish a smooth, low resistance to movement of pawl release link 36 via rotation of power release gear 52 in the second direction, and thus, minimizing the resistance on motor 30. The amount of rotational travel of power release gear 53 in the initial stage of being driven prior to causing rotation travel of pawl release link 35 can be provided as desired via orienting pin 76 in slot while at a home, rest position (FIGS. 6A, 9A) as desired, and thus, the motor 30 can establish increased turning speed and inertia prior to driving pawl release lever 35. As such, in addition to the increased torque relative to the normal operating condition provided by the lever arm advantage over the length of pawl release link extending between its ends 71, 72 acting on pin 76, the increased motor inertia allows motor 30 to remain small and compact, thus, not having to be oversized to generate an increased emergency load sufficient to cause pawl 34 to move from its ratchet holding position to its ratchet releasing position under increased friction between ratchet 32 and pawl 34.

Under normal use condition, the rotation of power release gear 52 in the first direction causes the pawl 34 to move from the ratchet holding position to the ratchet releasing position in X seconds upon actuating the power actuator 30 in the first direction and the rotation of power release gear 52 in the second direction causes the pawl 34 to move from the ratchet holding position to the ratchet releasing position in X+Y seconds upon actuating the power actuator in the second direction, wherein X seconds is less that X+Y seconds. Accordingly, pawl 34 is released from the ratchet holding position to the ratchet releasing position more quickly in the normal operating condition. However, in the normal operating condition, power release motor 30 is effective to cause pawl 34 to move from the ratchet holding position to the ratchet releasing position under a first seal load (across a door seal 44), while in the emergency operating condition, power release motor 30 is effective to cause pawl 34 to move from the ratchet holding position to the ratchet releasing position under a second seal load, wherein second seal load is greater than the first seal load. In a non-limiting example, the first seal load can be about 500N and the second seal load can be about SkN.

Figure 12:
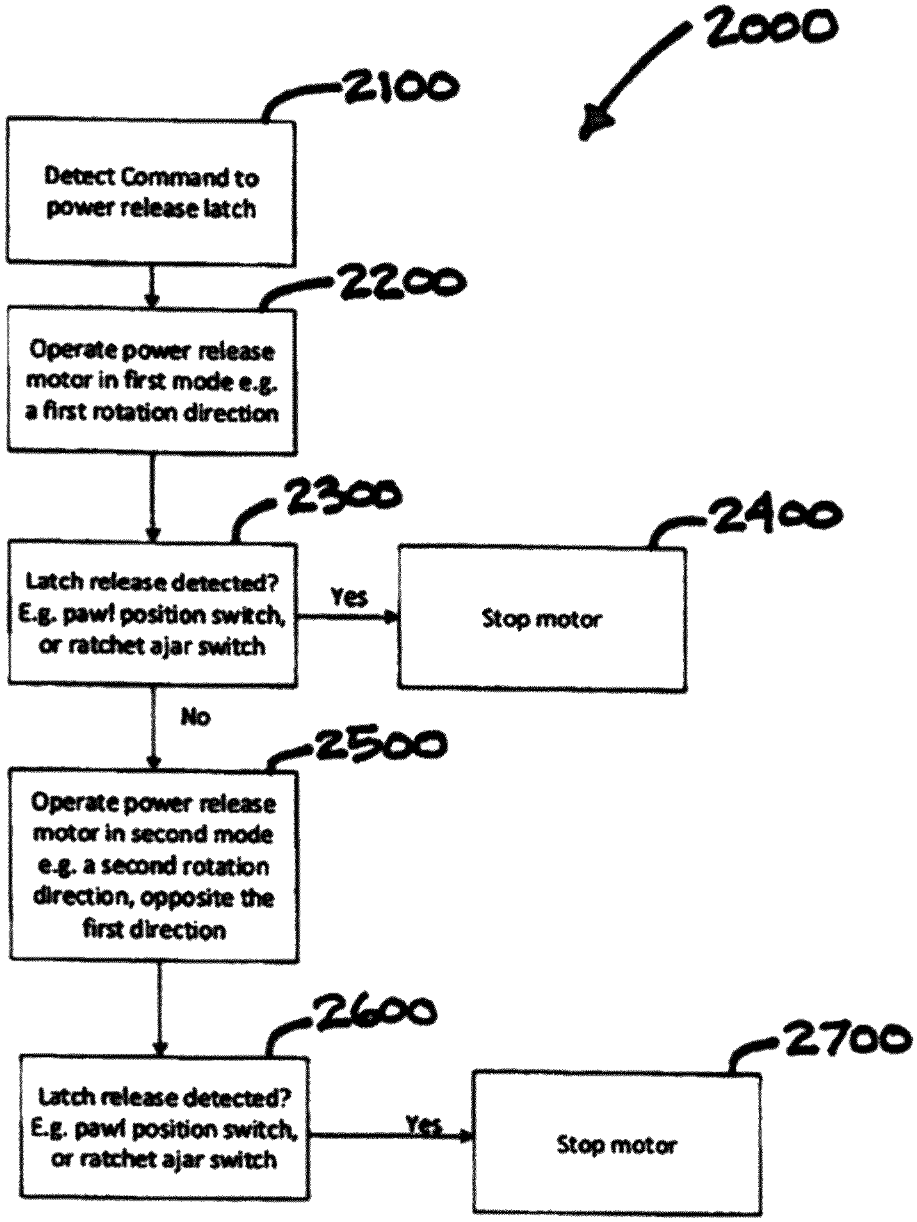
FIG. 12 is a method of releasing a power latch assembly of a closure panel of a motor vehicle.

In accordance with another aspect of the disclosure, as shown in FIG. 12, a method 2000 of releasing a power latch assembly 10 of a closure panel 12 of a motor vehicle 14 is provided. The method 2000 includes: a step 2100 of detecting a command to power release the power latch assembly 10; a step 2200 of operating a motor 30 of the power latch assembly 10 in a first mode; a step 2300 of detecting whether the power latch assembly 10 has been released. Step 2300 may include determining if the power latch assembly 10 has not been released after expiry of a predetermined time out; a step 2400 of stopping the motor 30 if the detecting indicates the power latch assembly 10 has been released; a step 2500 of operating the motor 30 of the power latch assembly 10 in a second mode if the detecting indicates the power latch assembly 10 has not been released; a step 2600 of detecting whether the power latch assembly 10 has been released; and a step 2700 of stopping the motor 30 if the detecting indicates the power latch assembly 10 has been released.

According to another aspect of the present disclosure, the method 2000 can further include providing the first mode to include rotating an output 48 of the motor 30 in a first direction and providing the second mode to include rotating the output 48 of the motor 30 in a second direction opposite the first direction.

Figure 13:
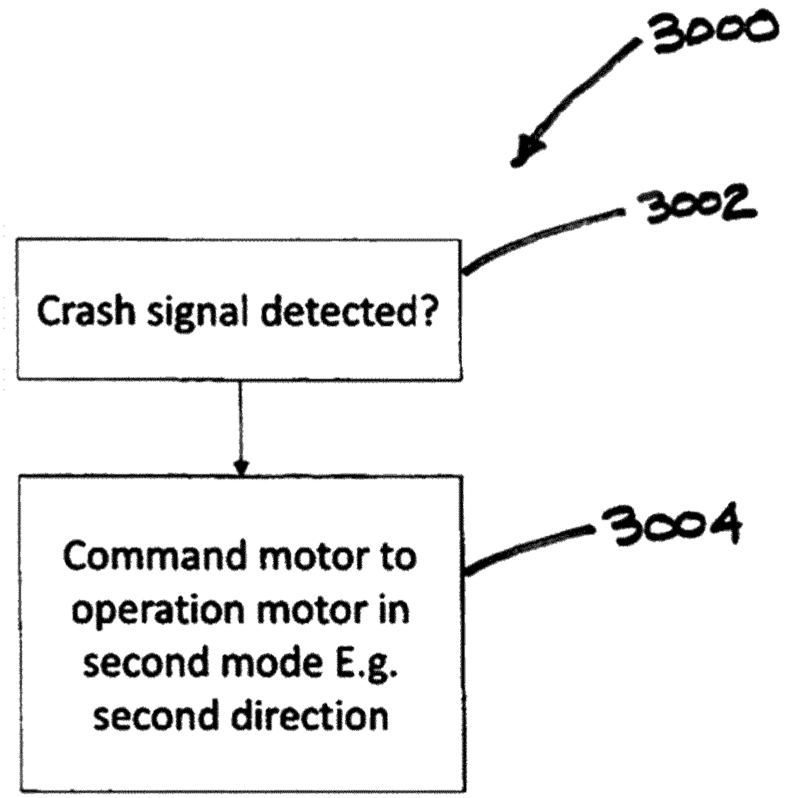
FIG. 13 is a method of releasing a power latch assembly of a closure panel of a motor vehicle in accordance with another aspect of the disclosure.

In accordance with another aspect of the disclosure, as shown in FIG. 13, a method 3000 operating a latch power release actuator 30 of a power latch assembly 10 having a first output torque and an increased second output torque is provided. The method 3000 includes a step 3002 of detecting a crash condition of the vehicle, such as by receiving a crash signal from a control unit, such as the ECU 64 receiving a crash or emergency signal from a Body Control Module, as shown at box 39 of FIG. 3, and in response to receiving the signal in step 3004, next operating the power release actuator 30 to couple the increased second output torque to the pawl 34 as described herein above for example, such as by configuring the power release actuator 30 to rotate the output 48 in a second direction to drive a power release gear 52 in a second direction opposite the first direction to generate the second output torque, greater than the first output torque, via a pawl release link 36 acting forcibly on a pawl release lever 35. As a result the power from the latch power release actuator 30 is transferred to the pawl 34 using the increased second output torque during an emergency or crash condition. Power and time is therefore not expended by having first to operate the latch power release actuator 30 using the first output torque before again operating the release actuator 30 using the increased second output torque after determining the first output torque is unable to release the latch during the emergency or crash condition of the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power latch assembly for a closure panel, comprising:

a ratchet configured for movement between a striker capture position and a striker release position and being biased toward said striker release position;

a pawl configured for movement between a ratchet holding position, whereat said pawl maintains said ratchet in said striker capture position, and a ratchet releasing position, whereat said pawl releases said ratchet for movement of said ratchet to said striker release position;

a power release actuator configured to move in a first direction to move said pawl from the ratchet holding position to the ratchet releasing position and configured to move in a second direction to move said pawl from the ratchet holding position to the ratchet releasing position; and a drive mechanism having a only single stage gear reduction operably connecting an output of said power release actuator to said pawl, said drive mechanism being configured to apply a first torque output to said pawl when said power release actuator rotates in the first direction and a second torque output to said pawl when said power release actuator rotates in the second direction, wherein the second torque is greater than the first torque.

2. The power latch assembly of claim 1, wherein said drive mechanism includes a power release gear operably driven by said output, a pawl release lever driven by said power release gear, and a pawl release link coupling said power release gear to said pawl release lever.

3. The power latch assembly of claim 2, further including a drive lug fixed to said power release gear for conjoint rotation with said power release gear, wherein said drive lug engages said pawl release lever to move said pawl from the ratchet holding position to the ratchet releasing position when the power release actuator moves in the first direction.

4. The power latch assembly of claim 3, wherein said drive lug moves away from said pawl release lever when the power release actuator moves in the second direction.

5. The power latch assembly of claim 4, wherein said pawl release link engages said pawl release lever to move said pawl from the ratchet holding position to the ratchet releasing position when the power release actuator moves in the second direction.

6. The power latch assembly of claim 5, wherein said pawl release link and said pawl release lever are configured for lost motion with one another when the power release actuator moves in the first direction.

7. The power latch assembly of claim 6, wherein said pawl release link has an elongate slot extending between opposite first and second ends and said pawl release lever has a pin disposed in said elongate slot, said pin being configured to slide within said elongate slot away from said first end toward said second end in the lost motion when the power release actuator moves in the first direction.

8. The power latch assembly of claim 7, wherein said first end of said elongate slot engages said pin to move said pawl release lever into engagement with the pawl to move the pawl from the ratchet holding position to the ratchet releasing position when said power release actuator moves in the second direction.

9. The power latch assembly of claim 6, wherein said pawl release link is pivotably fixed to said power release gear by a drive pin extending from said power release gear, said drive pin being spaced from a rotational axis of said power release gear.

10. The power latch assembly of claim 1, wherein the power release actuator causes the pawl to move from the ratchet holding position to the ratchet releasing position in (X) seconds upon rotating said power release actuator in the first direction and causes the pawl to move from the ratchet holding position to the ratchet releasing position in (X+Y) seconds upon rotating said power release actuator (30) in the second direction, wherein (X) seconds is less that (X+Y) seconds.

11. The power latch assembly of claim 1, further including a controller configured in operable communication with the power release actuator, the controller being configured to operate in a normal mode, whereat the output of the power release actuator is caused to rotate in the first direction, and in a crash mode, whereat the output is caused to rotate in the second direction opposite the first direction, wherein the drive mechanism includes a cam mechanism and a crank mechanism, wherein the power release actuator is operable to move the pawl from the ratchet holding position to the ratchet releasing position using the cam mechanism when the controller is in the normal mode, wherein the power release actuator is operable to move the pawl from the ratchet holding position to the ratchet releasing position using the crank mechanism when the controller is in the crash mode.

12. A method of releasing a power latch assembly of a closure panel of a motor vehicle, comprising:

detecting a command to power release the power latch assembly;

operating a motor to actuate a drive mechanism having only a single stage gear reduction of the power latch assembly in a first mode;

detecting whether the power latch assembly has been released;

stopping the motor if the detecting indicates the power latch assembly has been released;

operating the motor to actuate the drive mechanism of the power latch assembly in a second mode if the detecting indicates the power latch assembly has not been released;

detecting whether the power latch assembly has been released; and stopping the motor if the detecting indicates the power latch assembly has been released.

13. The method of claim 12, wherein the first mode includes rotating an output of the motor in a first direction and wherein the second mode includes rotating the output of the motor in a second direction opposite the first direction.

14. The method of claim 13, further including causing a first torque to be imparted on a pawl of the power latch assembly upon rotating the output of the motor in the first direction and causing a second torque to be imparted on the pawl of the power latch assembly upon rotating the output of the motor in the second direction, with the second torque being greater than the first torque.

15. The method of claim 13, further including causing the pawl to move from a ratchet holding position to a ratchet releasing position in (X) seconds upon rotating the output of the motor in the first direction and causing the pawl to move from the ratchet holding position to the ratchet releasing position in (X+Y) seconds upon rotating the output of the motor in the second direction, wherein (X) seconds is less that (X+Y) seconds.

16. The method of claim 14, further including causing a pawl release lever to engage the pawl to impart the first torque on the pawl upon rotating the output of the motor in the first direction and causing the pawl release lever to engage the pawl to impart the second torque on the pawl upon rotating the output of the motor in the second direction.

17. The method of claim 16, further including engaging the pawl release lever with a drive lug extending from a power release gear driven by the motor to impart the first torque on the pawl upon rotating the output of the motor in the first direction and engaging the pawl release lever with a pawl release link coupling the power release gear to the pawl release lever to impart the second torque on the pawl upon rotating the output of the motor in the second direction.

18. A method of releasing a power latch assembly of a closure panel of a motor vehicle, comprising:

operating a power release actuator of the power latch assembly having only a single power release gear in a first mode to rotate a first output on the single power release gear in a first direction to move a pawl, via application of a first torque, from a ratchet holding position to a ratchet releasing position and causing a ratchet to move from a striker capture position to a striker release position; and, if the pawl fails to move to the ratchet release position under the first mode, operating the power release actuator of the power latch assembly in a second mode to rotate a second output on the single power release gear the output in a second direction opposite the first direction to move the pawl, via application of a second torque, from the ratchet holding position to the ratchet releasing position and causing the ratchet to move from a striker capture position to a striker release position, wherein the second torque is greater than the first torque.

19. The method of claim 18, further including detecting whether the power latch assembly has been released while moving the power release actuator in the first direction and stopping the power release actuator if the detecting indicates the power latch assembly has been released.

20. A power latch assembly for a closure panel, comprising:

a ratchet configured for movement between a striker capture position and a striker release position and being biased toward said striker release position;

a pawl configured for movement between a ratchet holding position, whereat said pawl maintains said ratchet in said striker capture position, and a ratchet releasing position, whereat said pawl releases said ratchet for movement of said ratchet to said striker release position;

a power release actuator having only a single power release gear configured having a first face and an opposite second face; and a drive mechanism operably connecting a first output of said single power release gear provided on the first face to said pawl, and operably connecting a second output of said single power release gear provided on the second face to said pawl.

* * * * *